US010420015B2

(12) United States Patent
Breuer et al.

(10) Patent No.: US 10,420,015 B2
(45) Date of Patent: Sep. 17, 2019

(54) METHOD FOR TRANSFER OF INFORMATION IN A WIRELESS CELLULAR NETWORK

(71) Applicant: GEMALTO M2M GMBH, Munich (DE)

(72) Inventors: Volker Breuer, Boetzow (DE); Lars Wehmeier, Falkensee (DE); Thomas Ulrich, Bad Dürkehim (DE)

(73) Assignee: GEMALTO M2M GMBH, Munich (DE)

( * ) Notice: Subject to any disclaimer, the term of this patent is extended or adjusted under 35 U.S.C. 154(b) by 0 days.

(21) Appl. No.: 15/564,003

(22) PCT Filed: Apr. 5, 2016

(86) PCT No.: PCT/EP2016/057424
§ 371 (c)(1),
(2) Date: Oct. 3, 2017

(87) PCT Pub. No.: WO2016/162333
PCT Pub. Date: Oct. 13, 2016

(65) Prior Publication Data
US 2018/0146416 A1 May 24, 2018

(30) Foreign Application Priority Data

Apr. 8, 2015 (EP) .................................... 15162789

(51) Int. Cl.
*H04W 48/02* (2009.01)
*H04W 74/00* (2009.01)
(Continued)

(52) U.S. Cl.
CPC ............ *H04W 48/02* (2013.01); *H04W 4/06* (2013.01); *H04W 4/70* (2018.02); *H04W 8/18* (2013.01);
(Continued)

(58) Field of Classification Search
CPC ....... H04W 48/02; H04W 28/16; H04W 8/24; H04W 8/18
See application file for complete search history.

(56) References Cited

U.S. PATENT DOCUMENTS

2010/0267405 A1\* 10/2010 Chin .................... H04W 48/12
455/500
2012/0106332 A1 5/2012 Tiwari
(Continued)

FOREIGN PATENT DOCUMENTS

| WO | 00/72609 A1 | 11/2000 |
| WO | 2015/020583 A1 | 2/2015 |
| WO | 2015/026392 A1 | 2/2015 |

OTHER PUBLICATIONS

Alcatel-Lucent, et al., "Common control messages for LC-MTC", 3GPP Draft, R1-150130-Rel-13 MTC—Common Control Messages V05, 3rd Generation Partnership Project (3GPP), Mobile Competence Centre, 650, Route Des Lucioles, F-06921 Sophia-Antipolis Cedex, France, Feb. 8, 2015, pp. 1-4, vol. RAN WG1, Internet: <http://www.3gpp.org/ftp/Meetings_3GPP_SYNC/RAN1/Docs/>.

(Continued)

*Primary Examiner* — Mohammad S Anwar
(74) *Attorney, Agent, or Firm* — Buchanan Ingersoll & Rooney PC

(57) ABSTRACT

The present invention relates to a method for transmitting system information from a base station to a user equipment, the user equipment being a limited-bandwidth device, camping on the base station, wherein the system information are divided in a plurality of system information blocks, which are at least once transmitted during one broadcast channel modification period, the method comprising the step of—transmitting a first system information block the first system information block comprising at least—a broadcast channel
(Continued)

change notification tag, and—a barring indication flag for limited-bandwidth devices, and wherein each other of the plurality of system information blocks is larger in size than the first system information block.

16 Claims, 4 Drawing Sheets

(51) Int. Cl.
| | |
|---|---|
| *H04W 4/06* | (2009.01) |
| *H04W 48/12* | (2009.01) |
| *H04W 4/70* | (2018.01) |
| *H04W 8/24* | (2009.01) |
| *H04W 16/26* | (2009.01) |
| *H04W 28/02* | (2009.01) |
| *H04W 28/08* | (2009.01) |
| *H04W 28/16* | (2009.01) |
| *H04W 8/18* | (2009.01) |
| *H04W 48/10* | (2009.01) |
| *H04W 72/04* | (2009.01) |
| *H04W 8/22* | (2009.01) |

(52) U.S. Cl.
CPC ............... *H04W 8/22* (2013.01); *H04W 8/24* (2013.01); *H04W 16/26* (2013.01); *H04W 28/0215* (2013.01); *H04W 28/08* (2013.01); *H04W 28/16* (2013.01); *H04W 48/10* (2013.01); *H04W 48/12* (2013.01); *H04W 72/0493* (2013.01); *H04W 74/006* (2013.01)

(56) References Cited

U.S. PATENT DOCUMENTS

2014/0128029 A1* 5/2014 Fong ................... H04W 48/12 455/411
2015/0049693 A1* 2/2015 Seo ....................... H04L 5/0032 370/329

OTHER PUBLICATIONS

Alcatel-Lucent, et al., "Options for LC-MTC UE SIB Transmission", 3GPP Draft, R2-150467, 3$^{rd}$ Generation Partnership Project (3GPP), Mobile Competence Centre, 650, Route Des Lucioles, F-06921 Sophia-Antipolis Cedex, France, Feb. 8, 2015, pp. 1-6, vol. RAN WG2, Internet: <http://www.3gpp.org/ftp/Meetings_3GPP_SYNC/RAN2/Docs/>.
HiSilicon Huawei, et al., "SIB in Enhanced Coverage Mode", 3GPP Draft, R2-140279 SIB in Enhanced Coverage Mode, 3$^{rd}$ Generation Partnership Project (3GPP), Mobile Competence Centre, 650, Route Des Lucioles, F-06921 Sophia-Antipolis Cedex, France, Feb. 9, 2015, pp. 1-4, vol. RAN WG2, Internet: <http://www.3gpp.org/ftp/Meetings_3GPP_SYNC/RAN2/Docs/>.
Nokia Networks, et al., "PBCH/MIP Enhancement for MTC", 3GPP Draft, R1-150262, 3$^{rd}$ Generation Partnership Project (3GPP), Mobile Competence Centre, 650, Route Des Lucioles, F-06921 Sophia-Antipolis Cedex, France, Feb. 8, 2015, pp. 1-6, vol. RAN WG1, Internet: <http://www.3gpp.org/ftp/Meetings_3GPP_SYNC/RAN1/Docs/>.
NTT DOCOMO, "Views on SIB design in Rel-13 Low Cost MTC", 3GPP Draft, R1-150535 SIB for LC-MTC, 3$^{rd}$ Generation Partnership Project (3GPP), Mobile Competence Centre, 650, Route Des Lucioles, F-06921 Sophia-Antipolis Cedex, France, Feb. 8, 2015, pp. 1-4, vol. RAN WG1, Internet: <http://www.3gpp.org/ftp/Meetings_3GPP_SYNC/RAN1/Docs/>.
International Search Report (PCT/ISA/210) dated Jun. 10, 2016, by the European Patent Office as the International Searching Authority for International Application No. PCT/EP2016/057424.
Written Opinion (PCT/ISA/237) dated Jun. 10, 2016, by the European Patent Office as the International Searching Authority for International Application No. PCT/EP2016/057424.
R2-150519, 3GPP TSG-RAN WG2 Meeting #89, Athens, Greece, Feb. 9-13, 2015, "System Information for LC MTC", Discussion and Decision, Qualcomm Incorporated, pp. 1-4.
Office Action (Notice of Reasons for Rejection) dated Oct. 23, 2018, by the Japanese Patent Office in corresponding Japanese Patent Application No. 2017-550473 and English translation of the Office Action. (5 pages).

* cited by examiner

METHOD FOR TRANSFER OF INFORMATION IN A WIRELESS CELLULAR NETWORK

FIELD OF THE INVENTION

The present invention relates to a method for transmitting information from a base station to a user equipment.

The invention also pertains to a base station using said method. The invention further relates to a user equipment configured to receive information transmitted using said method.

BACKGROUND OF THE INVENTION

The cellular standards, in particular those supporting long term evolution (LTE) standard, are beginning to face the fact that different types of user equipment are operating within the wireless networks. A special interest is directed to so-called machine-type communication devices (MTC), which behave differently than mobile handsets.

As part of the standardization activities in Release 13 for such MTC devices special channels and information blocks are foreseen.

One of the key elements is the definition of system information blocks (SIB). As part of that system information blocks dedicated for MTC devices (M-SIBs) are suggested. System information is known to be distributed in different system information blocks, which are transmitted during one broadcast channel modification period.

Further MTC devices are separated in low complexity and low complexity devices with Enhanced Coverage UEs. Low complexity is achieved by placing in bandwidth reception capabilities lower demands than for normal devices, i.e. those devices are only required to receive 1.4 MHz radio frequency bandwidth. The low complexity devices for enhanced coverage are characterized that they are receiving or transmitting information in a repetitive manner and the receiver performing coherent average so that additional reception gain is achieved i.e. these are also low complexity devices applying coverage enhancements techniques. These two categories of devices are defined in specification 3GPP TR 36.888 V12.0.0, which content is incorporated here by reference.

Both of these types of devices address different use cases and hence place different burdens on the SIB handling. It is in particular preferable to address both types of devices with one common set of M-SIBs.

The enhanced coverage devices typically considered as meters are static/semi-static and gain their enhanced coverage by repetitive reading of the related information. This is also applicable for the SIBs itself. The number of repetitions for enhanced coverage may be very high, which leads to high latencies for receiving of all system information in an UE. Times of 10.24 s are assumed to be acceptable for these devices.

On the other hand generally SIB1 needs to be read in order to know if in at least one of the other system information blocks a change has happened, which is indicated by the so-called BCCH value tag. For enhanced coverage devices it is by now a challenge to successfully decode the SIB1 during one broadcast channel modification period.

However, it is not only the latency but also the corresponding reading time and consequently the battery consumption which causes an inappropriate operation of such devices. In particular repetitive reading during operation for e.g. acquiring the BCCH value tag or even the entire SIB structure leads to additional power consumption. This is in particular true in case of SIB reading operations of the UEs which are in vain, due to the fact that the SIB1-reading could not be finished during the broadcast channel modification period.

It is therefore the goal of present invention to overcome the mentioned disadvantages and to propose a solution for an improved transmission of system information from a base station to a user equipment.

Further alternative and advantageous solutions would, accordingly, be desirable in the art.

SUMMARY OF THE INVENTION

For this it is according to a first aspect of the invention suggested a method for transmitting system information from a base station to a user equipment according to claim 1. It is further suggested according to a second aspect of the invention a base station according to claim 7. Additionally it is suggested according to a third aspect of the invention a user equipment according to claim 12.

According to the first aspect it is proposed a method for transmitting system information from a base station to a user equipment, the user equipment being a limited-bandwidth device, camping on the base station, wherein the system information are divided in a plurality of system information blocks, which are at least once transmitted during one broadcast channel modification period, the method comprising the step of transmitting a first system information block, the first system information block comprising at least a broadcast channel change notification tag, and a barring indication flag for limited-bandwidth devices, and wherein each other of the plurality of system information blocks is larger in size than the first system information block.

The invention is based on the commonly known architecture of wireless cellular networks according to technology standards like GSM, UMTS and LTE. As part of that, the base stations, resp. NodeB or eNodeB, transmit in a dedicated broadcast channel a defined collection of system information to the user equipments which are operating with the respective base station. This operation relationship is called camping on a base station.

According to recent development it is foreseen to take into account the existence of limited-bandwidth devices. These UEs form a special class of devices—in particular machine type communication devices—which comprise fewer resources for operating in the wireless cellular network, and are generally operating in a different manner than mobile handsets.

Furthermore limited-bandwidth devices might additionally be situated in places with only a comparably reduced receivable signaling power from the base station, where the UE is currently camping on. Such limited-bandwidth devices are called enhanced coverage devices, and they are able to compensate the reduced signaling power by repeating to read the signals, in order to get sufficient coverage gain.

The system information provided by the base station to the UEs is known to be submitted in several blocks, the System Information Blocks (SIB). Typically the normal user equipment reads the first SIB—the SIB1. The SIB1 comprises according to the present definition up to 20 fields of information including the BCCH value tag. This BCCH value tag that allows for the UE to derive whether the content of one of the SIBs has changed. Based on that information the user equipment continues to read the rest of the system information blocks transmitted by the base station.

The system information blocks are completely transmitted during a broadcast channel modification period. When the SIB1 indicates with the BCCH value tag that no modification has happened, this status lasts for one broadcast channel modification period. The broadcast channel modification period is typically configured by the wireless cellular network in relationship to paging cycle and a predefined coefficient which takes values of the power of 2. Based on that the broadcast channel modification period may take values between 0.64 and 40.96 seconds, like it is shown in following table.

| Paging cycle/ Coefficient | 32 | 64 | 128 | 256 |
|---|---|---|---|---|
| 2 | 0.64 s | 1.28 s | 2.56 s | 5.12 s |
| 4 | 1.28 s | 2.56 | 5.12 s | 10.24 s |
| 8 | 2.56 s | 5.12 s | 10.24 s | 20.48 s |
| 16 | 5.12 s | 10.24 s | 20.48 s | 40.96 s |

The UE is able to derive the beginning and duration of the broadcast channel modification period from network specific information like the paging cycle and the received system frame number (SFN).

In order to support the additional type of user equipment it is discussed to introduce a separate set of system information for limited-bandwidth devices. For those devices it is advantageous to use the BCCH value tag in order to avoid unnecessary reading of SIBs.

In dependency of the size of the SIB1 and the broadcast channel modification period it can happen for enhanced coverage devices, that the repetitive reading of the SIB1 does not finish during one broadcast channel modification period. This is in particular due to two situations:
a) the reading started not at the beginning of the broadcast channel modification period
b) the reading time is larger than the broadcast channel modification period.

The first situation means unnecessary reading efforts, hence power consumption invested in vain.

The second situation means, that when the SIB1 is read, the next broadcast channel modification period is reached, and therefore the information from the SIB1 may already be outdated. As it is known that for enhanced coverage devices that the reading of the current SIB1 requires 500 repetitions and thus lasts up to 10 seconds, then the table above indicates that only for a minority of configurations the broadcast channel modification period is long enough for reading a full SIB1 for enhanced coverage devices.

In order to solve that issue it is proposed to introduce to the set of system information blocks for limited-bandwidth devices a small new SIB1, a so-called M-SIB1, which can be received by enhanced coverage devices faster and would help to meet cost and power saving targets of MTC devices much better. It is therefore envisaged to focus for the M-SIB1 on the absolute minimum content. Further it is preferable to address both types, the enhanced coverage devices and the common limited-bandwidth devices with the same type of M-SIBs.

Hence it is proposed that the M-SIB1 comprises a broadcast channel change notification tag. This tag indicates to the UE that compared to the last reading of the system information a change occurred in at least one of the SIBs.

In one preferable embodiment the broadcast channel change notification tag corresponds to the mentioned BCCH value tag.

In another preferably embodiment the broadcast channel change notification tag simply comprises a binary value indicating if a change has happened.

It is further proposed that the M-SIB1 comprises a barring indication flag for limited-bandwidth devices. This flag indicates to the UE, whether reading is sensible at all for a MTC-device. Barring indications are important for network operators to push certain devices—in this case MTC-devices—from operating with the currently active base station, in order to maintain stability of the wireless cellular network. It is important that addressed UEs react without remarkable delay. Hence it is advantageous to put the barring indication flag into the M-SIB1.

The M-SIB1 is the system information block of the plurality of system information blocks with the smallest size. All other information necessary to be read are distributed over the rest of the system information blocks.

Having such a short M-SIB1 in advance of the further M-SIBs carrying the vast majority of information is beneficial for the UE in particular from power saving perspective as on the one hand system information need to be read regularly and on the other hand—unlike to normal UEs—SIB reading for enhanced coverage devices is power consuming.

Further this short M-SIB1 allows leaving the further relevant content of the M-SIBs in the SIBs and places where expected.

According to another preferred embodiment it is proposed a method wherein the first system information block further comprises a next broadcast change occurrence notification tag.

With this embodiment the new M-SIB1 is enhanced by another element. The next broadcast change occurrence notification tag provides for the receiving UE a prediction on when a change on the SIBs is expected. Hence the UE can estimate how many time and resources it can spend on reading the current system information blocks, or better wait until the next change is supposed to occur. As the UE is able to judge how many repetitive receptions of the system information or a certain SIB it requires to finish, with the information given in the suggested next broadcast change occurrence notification tag it is possible to decide if the UE continues reading or delays the reading until the next content change in the SIBs.

In particular the next broadcast change occurrence notification tag comprises a number of broadcast channel modification periods. With that the UE knows the number of broadcast channel modification periods it can spend to read the system information. For this the duration of the broadcast channel modification period is needed for the UE, which can be derived from the paging cycle and the SFNs.

Another simpler—and bitwise smaller—way would be to indicate the next broadcast change modification tag by a flag, which indicates if in the next x broadcast change modification periods a content change is expected, whereby the x is a defined constant or a value which is provided by means of the system information.

In another preferred embodiment it is proposed a method wherein said first system information block further comprises an indication relating to at least one other of said plurality of system information blocks.

With this embodiment it is proposed to enhance the new M-SIB1 by another element. According to this embodiment the M-SIB1 indicates in particular to the receiving UE where at least one other system information block is situated. This information is preferably provided by means of system frame number (SFN) resp. an offset of SFN modulo paging period.

In particular this indication refers to a SIB resp. M-SIB where a content change has happened compared to previous transmissions.

Alternatively the repetition or interleaving scheme of other SIBs is provided to the UE, wherein the UE figures out how often and in which order the different SIBs are transmitted.

With these information the UE gets more detailed information and has the possibility to only read the necessary SIBs in particular those where a content change has happened. As for reading each SIB a couple of repetitions need to be read for limited-bandwidth devices, they can optimize its efforts and power consumption.

Additionally in an advantageous embodiment it is proposed a method wherein the minimum broadcast channel modification period for limited-bandwidth devices is configured to last at least 10.24 seconds.

This embodiment basically suggests increasing the broadcast channel modification period. This is in particular advantageous for enhanced coverage devices, and makes sure that these devices are able to read all system information blocks during a broadcast channel modification period.

The main reason for the current development in the opposite direction was by now, that an MTC access barring would with the SIB-structure of the prior art lead to a very slow reaction of the UEs, which means up to >10 seconds. As the access barring of MTC devices is a security mechanism of the wireless cellular networks in order to assure stability of the network, such times, which directly correlate with the broadcast channel modification period, are not acceptable. Hence an increase of the broadcast channel modification period was not feasible.

Together with the proposed new M-SIB1, which include the barring indication flag, even enhanced coverage devices achieve to read and decode the M-SIB1 much earlier than in the prior art. Hence an increase of the broadcast channel modification period with the described results is possible without the negative impact on the wireless cellular networks.

This is in particular true, when the M-SIB1 is transmitted multiple times during a broadcast channel modification period.

Preferably the M-SIB1 is the M-SIB which has the largest number of repetitions from all M-SIBs during a broadcast channel modification period.

In a further advantageous embodiment it is proposed a method wherein the system information has associated a validity period, wherein the validity period for system information relating to limited-bandwidth devices is longer than for system information relating to non-limited-bandwidth devices.

With the validity period the user equipment receives an indication how long the received system information, when no change occurs, is supposed to stay valid. Upon return from out of coverage a UE needs to judge if the previously read and stored system information messages are still valid. The validity period was in particular predefined by the standards as a constant, in particular of 3 hours.

It is now proposed to introduce a second validity period for limited-bandwidth devices. This second validity period is characterized that it is longer than the first validity period for non-limited-bandwidth devices, in particular mobile handsets. A feasible value for the second validity period would be 24 hours. Hence the limited-bandwidth devices may—when it is operating in idle mode without any additional transmissions are receptions in between—wait this time until it wakes up and read the M-SIB1. When a UE like a metering device is configured to send its data once per day or less than a day, with the first validity period it needed to read for each transmissions the full SIBs. With the proposed enhancement of the validity period for limited-bandwidth devices, for a good share of transmissions the system information needs not to be carried out, but can be retrieved from stored values. This is advantageous for limited-bandwidth devices in terms of power saving.

It is in particular proposed that an indication on the maximum of at least one of the validity periods is signaled as part of the system information.

Compared to the known handling of validity periods it is proposed that in particular for the second validity period an indication of the maximum value is indicated as part of the system information, hence in one of the M-SIBs.

Preferably this information is not supplied in the M-SIB1 in order not to increase the size of the M-SIB1.

The indication preferable comprises the number of hours, a certain class of validity periods, or any other indication relating to the envisaged validity period.

According to a second aspect of the invention it is proposed a base station being part of a wireless cellular network, comprising at least a transmitter, the base station being configured to divide system information for limited-bandwidth devices in a plurality of system information blocks and transmitted at least once during one broadcast channel modification period by means of the broadcast channel to a limited-bandwidth device, wherein the base station is further configured to:

transmit a first system information block, wherein the first system information block comprises at least:

a broadcast channel change notification tag, and a barring indication flag for limited-bandwidth devices, and wherein each other of the plurality of system information blocks is larger in size than the first system information block.

The base station is part of a wireless cellular network. The wireless cellular network is in particular supporting long term evolution (LTE) standard, also known as a 4G-network. Typically the same wireless cellular network comprises various radio access networks (RAN), like 2G, 3G and 4G and its respective wireless technology standards (GSM, EDGE, UMTS, HSDPA etc.), where a base station is assigned to one RAN. However at the same location, in particular in combined housings, preferably more than one base station each supporting different RANs are supported.

Preferably the base station comprises at least a processing unit and at least a memory unit, wherein computer programs are stored and executed in the processing unit, and carrying out the described operations of the proposed base station.

This aspect of the invention shares the advantages of the first aspect.

According to a third aspect of the invention it is suggested a user equipment configured for operating in camping relationship with a base station of a wireless cellular network, the user equipment being a limited-bandwidth device, further configured to receive a first system information block, comprising a part of system information being divided into a plurality of system information blocks, wherein the first system information block comprises at least a broadcast channel change notification tag, and a barring indication flag for limited-bandwidth devices, and wherein each other of the plurality of system information blocks is larger in size than the first system information block.

According to this aspect, a user equipment is foreseen that is operating with a base station according to the second aspect of the invention.

The user equipment is a device allowing wireless communication with the wireless cellular network and other user equipment operating in the same or other wireless cellular networks or in a landline network, like remote servers. The user equipment is a limited-bandwidth device, which applies in particular to machine type communication (MTC) devices, like meters, vending machines etc. Typically a UE is composed of a controlling appliance and a communication unit, which comprises all necessary parts for wireless signaling from and to a base station. It further comprises a processing unit and at least a memory unit storing software programs for executing the operations. Further transmissions from the base stations are stored in such memory units.

When a user equipment receives transmissions from a base station, this means that the transceiver of the communication unit gains the signals from the base station with sufficient power and is able to decode the transmitted messages.

This aspect of the invention shares the advantages of the first and second aspect.

It is further proposed according to an advantageous embodiment of this aspect a user equipment configured to decide about receive of at least one second system information block based on the information received in the first system information block.

With this embodiment the user equipment, in particular an enhanced coverage device, decides based on the retrieved data from the M-SIB1, if another M-SIB needs to be decoded. This is a reaction on the information provided with the M-SIB1.

In particular the broadcast channel change notification tag indicates if a change in one of the M-SIBs has occurred. If the user equipment has stored a complete set of system information from a previous reading effort, and the validity period, in particular for limited-bandwidth devices, has not expired, then the rest of the M-SIBs does not need to be read and decoded, if the broadcast channel change notification tag indicates no change in the other M-SIBs. In particular when the broadcast channel change notification tag consists of the BCCH value tag, and the BCCH value tag equals the previously read and stored value, then the UE does not need to read the remaining M-SIBs of this broadcast channel modification period. This is advantageous for power saving reasons for the UE.

As it is shown this invention advantageously solves the depicted problem and suggests a change that makes possible the operation of enhanced coverage devices with the base stations in a manner complying with power consumption objectives.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 shows in a time diagram 1 the transmission of system information blocks (SIBs) in a broadcast channel modification period 3 by one base station. Here two successive broadcast channel modification period 3(n), 3(n+1) are shown. They are delimited by the broadcast channel modification period boundaries 4', 4'', 4'''.

Each broadcast channel modification period lasts a defined number of m milliseconds, depending of the preconfigured paging period p frames multiplied with a coefficient c 2, 4, 8, 16, as well preconfigured by the wireless cellular network, resp. the base station. With a frame duration of 10 ms the broadcast channel modification period can take values between 0.64 and 40.96 seconds.

The timepoint of the broadcast channel modification period boundary 4', 4'', 4''' is calculated defined by system frame number (SFN) modulo m=0.

During one broadcast channel modification period 3 all the system information blocks SIB1, SIBx are fully transmitted, typically the system information are distributed into 13 SIBs. The first SIB SIB1 holds a couple of information for the user equipment which are camping on the respective base station. One of the information in the SIB1 is the BCCH value tag VT. This is typically a number which is incremented by one for each change of a SIBx resp. SIB1. When over two broadcast channel modification periods the BCCH value tag VT stays constant, this indicates to the receiving UEs that no change has happened on any of the SIBs.

Here it is indicated that during broadcast channel modification period 3(n) the BCCH value tag VT' in the SIB1 provides the value 42. In the next broadcast channel modification period 3(n+1) the BCCH value tag VT'' has the value 43. Hence, a change in the SIBs has happened between broadcast channel modification period 3(n) and 3(n+1).

For an enhanced coverage device it takes some time to retrieve SIB1 due to the necessary amount of repetitions in order to achieve sufficient coverage gain. Arrow 2' shows the time for an exemplary enhanced coverage device for reading of the SIB1.

The UE starts reading amidst the broadcast channel modification period 3(n), as it is indicate with arrow 2'. Due to the required duration the full retrieval of SIB1 crosses boundary 4'', hence does not finish in broadcast channel modification period 3(n). Due to that the UE needs to restart reading of SIB1, as the BCCH value tag VT might have changed in the next broadcast channel modification period 3(n+1)—which is actually the case.

This shows that the first SIBx reading effort indicated with arrow 2' was fully in vain, instead again reading of the SIBx in the next broadcast channel modification period as indicated with arrow 2'' is necessary.

Should the broadcast channel modification period 3(n) be even shorter than 10.24 seconds, which is for the majority of network configurations the case, then an enhanced coverage device would never successfully finish reading the SIB1 during one broadcast channel modification period 3, even less the SIBx.

Figure 1:
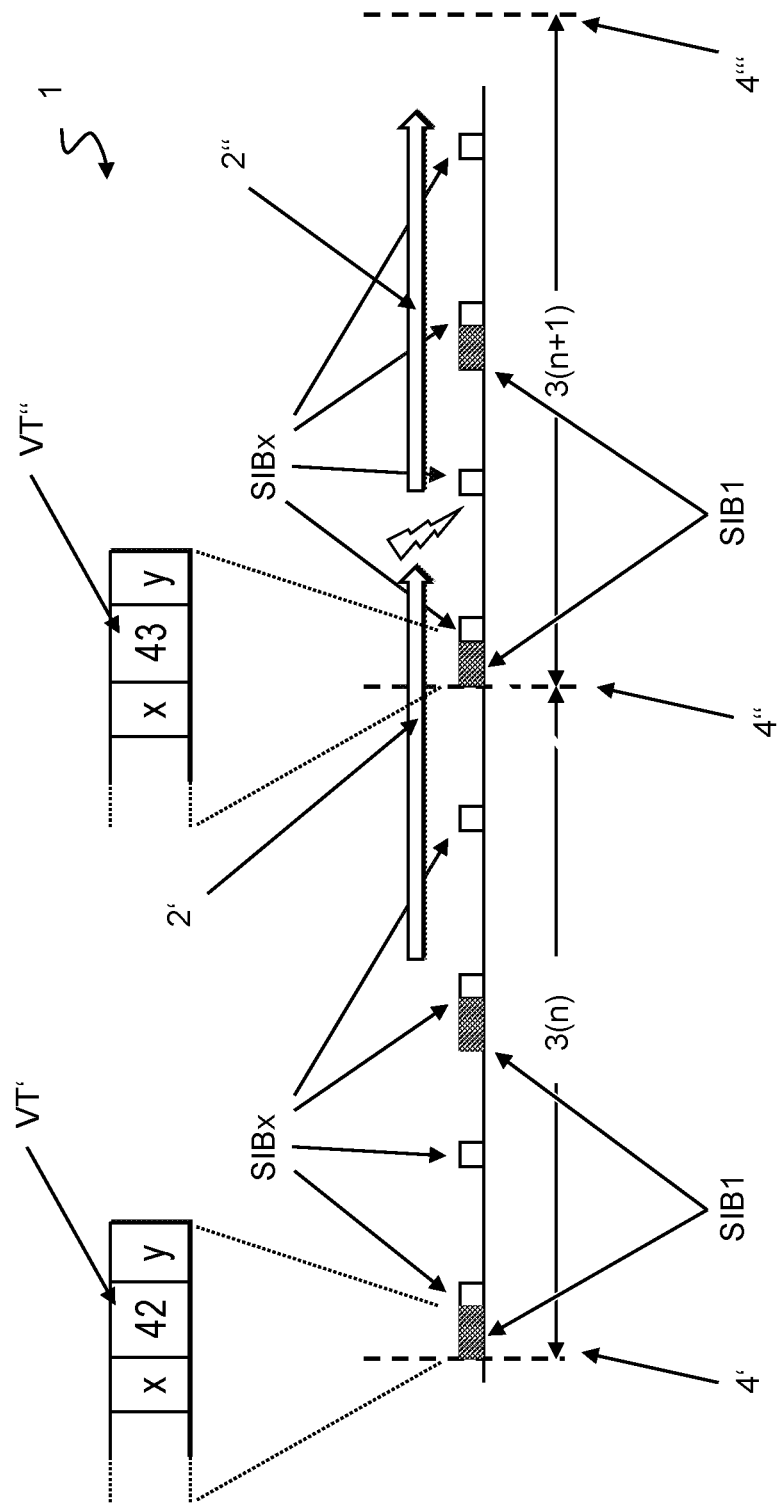
FIG. 1 represents schematically the transmissions of SIBs during a broadcast channel modification period according to the prior art.
Figure 2:
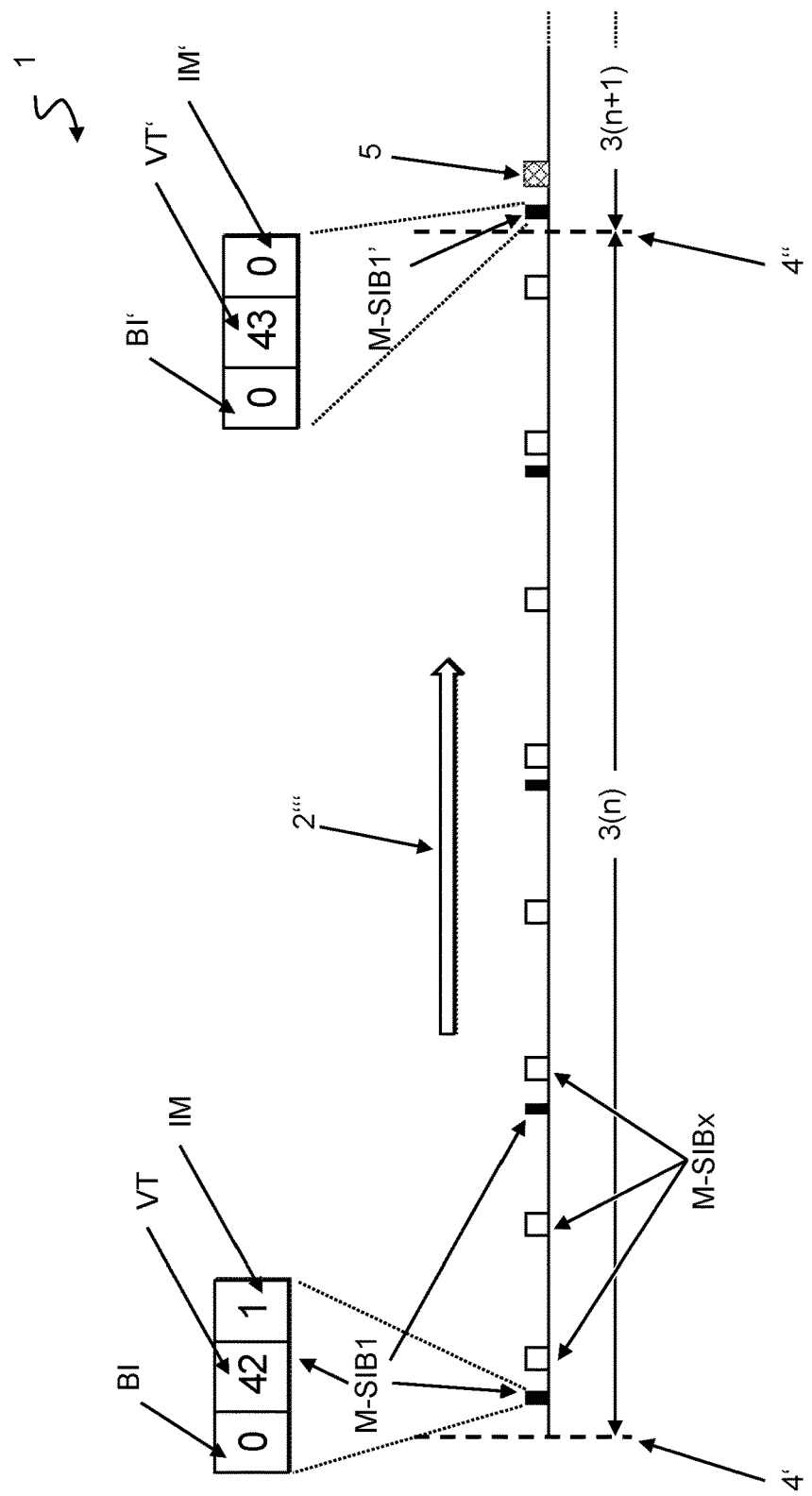
FIG. 2 shows schematically the transmission of M-SIBs during a broadcast channel modification period according to a preferred embodiment of present invention.

FIG. 2 shows a similar time diagram 1 indicating a preferred embodiment of the invention. The first improvement is the enlarged broadcast channel modification period 3(n), which allows longer time for enhanced coverage devices to read the SIBs.

Further now SIBs dedicated for MTC devices are foreseen, that is here the M-SIB1 and M-SIBx indicating the rest of the M-SIBs.

As it can be seen M-SIB1 is much shorter in size and hence in time to be read than it is known. It is preferably repeated more frequently during one broadcast channel modification period than other M-SIBx.

It is indicated for this embodiment that the M-SIB1 consists of three fields: the MTC barring indicator BI, the system information value tag VT' and the system information modification flag IM, which may indicate an upcoming change of system information in one of the next broadcast channel modification periods 3(n+x).

The fields of M-SIB1 are summarized in following table:

| SystemInformationBlockType1 field descriptions |
| --- |
| MTCBarringIndicator |
| barred means the cell is barred for MTC device |
| systemInfoValueTag |
| Change of any of the SIBs is indicated |
| systemInfoModification |
| Upcoming change of information in next broadcast channel modification period |

In the shown example for broadcast channel modification period 3(n) the M-SIB indicates that no MTC barring is activated, the current value tag is 42 and calculated from the current broadcast channel modification period 3(n) the following 3(n+1) will provide a change in at least one of the M-SIBx.

Arrow 2''' indicates the duration for reading the M-SIB1 for an enhanced coverage device. It can be seen that even start reading midst of the broadcast channel modification period 3(n) is concluded successfully within the broadcast channel modification period 3(n).

By receiving the M-SIB1 the UE has all relevant information and for the shown example knows that MTC devices are currently not barred, and during the next broadcast channel modification period 3(n+1) a change in at least one M-SIBx will happen, indicated through the specific M-SIB 5.

Would the system information modification tag IM show a higher value, then during broadcast channel modification period 3(n+1) the UE would not have to receive and decode the M-SIBx at all. Due to the MTC barring indicator at least M-SIB1 needed to be read should the UE plan any operation with the base station, in particular a data transmission.

In this example the next M-SIB1' during broadcast channel modification period 3(n+1) now indicates modified values, which indicate that no MTC-barring is active (BI'=0), with value tag VT' of value 43 that a change in one of the M-SIBs compared to the previous broadcast channel modification period 3(n) has happened, and that no change is happening in the next broadcast channel modification period (IM'=0).

Additionally some limited-bandwidth devices do not necessarily need the SIB repetitions, in particular UEs like cash-machines for credit-cards or in parking lots, for which power consumption is a critical topic. Furthermore for those UEs the access time, i.e. the latency caused by the SIB reading is very crucial as such UEs often are switched on and off by the application and hence it is the initial access time which affects the user experience.

In many scenarios such machines are operated static or they are brought to other locations i.e. credit-card machines in taxis or restaurants. Hence only a subset of these limited-bandwidth devices is configured to reliably access stored information. The rest needs to start again the whole reading process. This requires from the SIB structure that it has enough flexibility to allow for fast access. A value of 2.56 sec should be feasible to acquire all information related to initial access from the M-SIBs. Such a value should lead to an overall system access time being in an order to operate also these devices in scenarios which are often switched On and Off and cannot rely on stored information.

The decision and M-SIB scheduling should allow for both limited-bandwidth devices and enhanced coverage devices to be operated in a manner that the proposed M-SIB reading times can be achieved.

Figure 3:
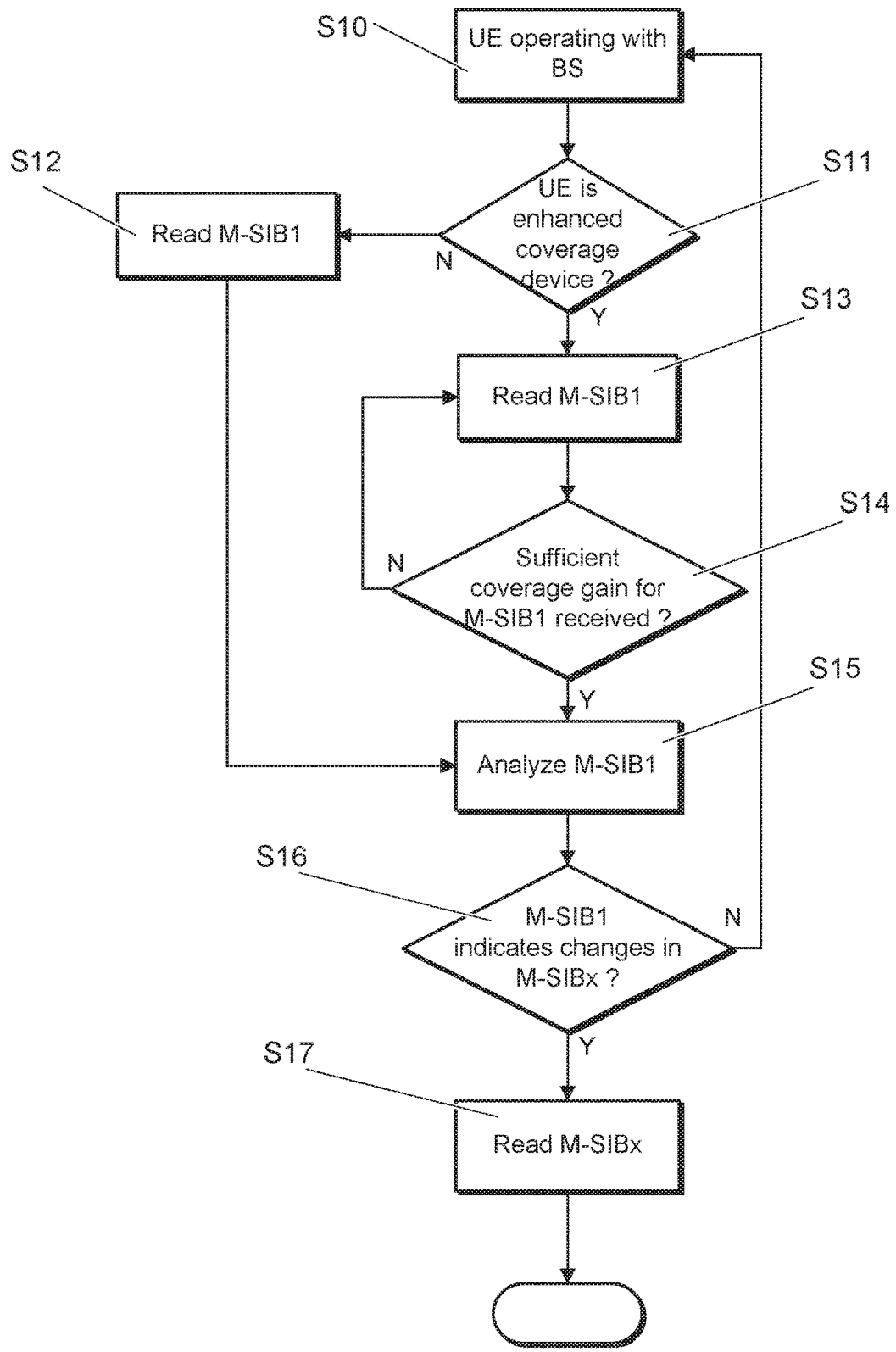
FIG. 3 represents a first flow chart representing the process flow of a first embodiment of the invention.

FIG. 3 shows a flow chart for a UE operating with a base station of reading the M-SIBs according to a preferred embodiment of the invention.

The process starts in step S10 with a UE camping on a base station. The UE is a MTC device which is addressed by M-SIBs transmitted from a base station according to a preferred embodiment of the invention.

In a first decision step S11 it is checked if the UE is an enhanced coverage device. Enhanced coverage devices are in particular those situated in an area with only limited received signaling power.

The decision if it is an enhanced coverage device may be done in situ due to the limited received signaling power. Alternatively the enhanced coverage characteristic is activated by a command, e.g. an AT command.

If the UE is not an enhanced coverage device, then the process branches to step S12 and the UE simply reads the new M-SIB1 within one try.

Otherwise it is read the M-SIB1 in S13 and checked in step S14, if sufficient coverage gain for M-SIB1 was received. If not it is jumped back to S13, if so, the process jumps to step S15.

With a SIB1 according to the prior art, which has a size of ca. 1000 Bits, it is expected that an enhanced coverage device needs to repeat up to 500 times the reading of the SIB1.

With the shorter M-SIB1 according to the invention, this amount of cycles is reduced in particular proportionally to the reduction of size. This is particular means that during the operation steps from step S13 to S15 most likely not broadcast channel modification period boundary appears.

When the M-SIB1 is read—if by an enhanced coverage device or not—in the next step S15 the received M-SIB1 is analyzed by the UE, that is the information fields are read out. In this embodiment it is then focused in step S16 that the M-SIB1 indicates changes in the M-SIBx of this broadcast channel modification period. This is in particular done by analyzing the broadcast channel change notification tag. In case the broadcast channel change notification tag comprises the BCCH value tag, then the UE needs to compare the determined value tag with a stored value tag of a previously read M-SIB1 within a previous broadcast channel modification period.

If the value tag is incremented compared to the previous value, then the stored value is in particular replaced by the new value.

Further the UE thus detects that at least one of the M-SIBx during this broadcast channel modification period has changed. Hence the UE continues reading the M-SIBx in step S17. Of course, depending on the fact if the UE is an enhanced coverage device or not, the step S17 requires repetitions as well.

In case the M-SIB1 comprises an indication relating to one particular M-SIBx, which is determined by the UE during the analysis step S15, then the UE is able in step S17 to read the data from a dedicated M-SIBx, which reduces the amount of reading cycles, hence also the amount of required energy for reading the changed M-SIBx.

In effect the content of the M-SIB1 is used by the UE to decide about reading further M-SIBx or not.

Figure 4:
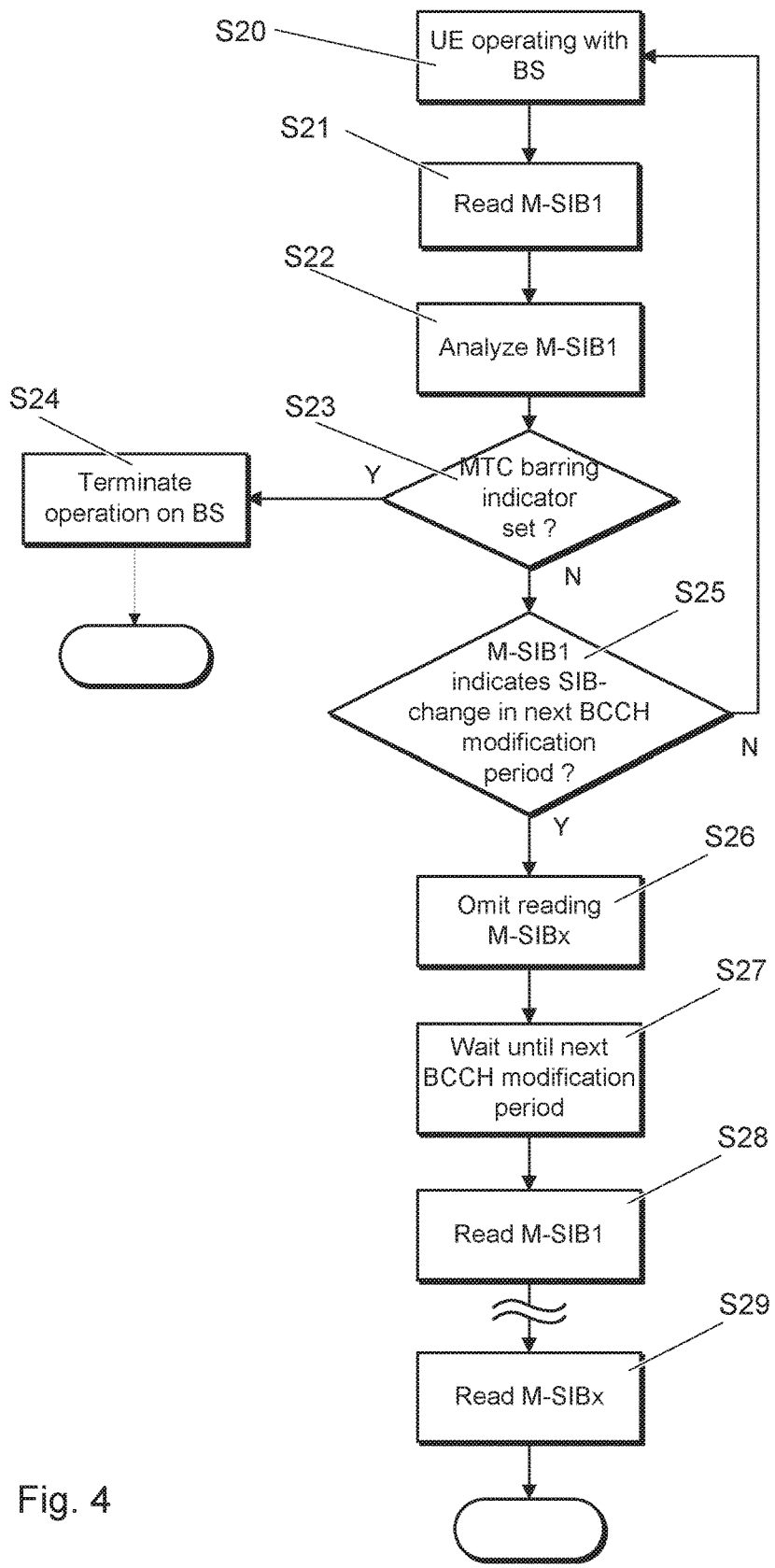
FIG. 4 represents a second flow chart representing the process flow of a second embodiment of the invention.

FIG. 4 shows in a flow chart another embodiment of present invention. It starts again in step S20 with a UE camping on a base station. Then it is read the M-SIB1 in step S21. For simplification purposes the distinction between enhanced coverage devices and regular limited-bandwidth devices is omitted in this flow chart. However the steps shown in FIG. 3 are applicable to this process flow as well, which applies to later steps of reading an M-SIB as well. After the M-SIB1 is read, it is analyzed in step S22 that means the comprised fields are read out. If that analysis shows in the barring indication flag BI that MTC devices are barred from operating with this base station, then in step S23 it is branched to step S24. This results in a termination of the operation of the UE with the base station. It is preferable to first check the barring indication before any other analysis is carried out by the UE.

If the barring indicator is not set, then the process branched to steps S25. Here it is checked if the M-SIB1 indicates an upcoming change of an M-SIBx by means of the next broadcast change occurrence notification tag.

If no such change is indicated then the UE can assume, that in the next broadcast channel modification period no other information are transmitted than in the current broadcast channel modification period and/or in a previous broadcast channel modification period and where the M-SIBx values are stored in a memory unit within the UE.

For reverting to the M-SIBx values stored in the memory unit it is preferably considered the validity period of the system information. In particular in case of a set of validity periods related to the M-SIBs, which means a validity period for limited-bandwidth devices and enhanced coverage devices, the respective validity period for the M-SIBs is to be taken into account. This is additionally true when the UE was deactivated and returns into operation. When the M-SIBx then indicates still the same BCCH value tag, the UE does not need to read the M-SIBx again, as long as the validity period is not expired. As for MTC devices such deactivation phases might last hours to days, a longer validity period than for mobile handset is advantageous and saves power resources at the MTC device.

Here the subsequent steps are depending on other system information fields in the M-SIB1, in particular the broadcast channel change notification tag. Hence the process flow shown in FIG. 3 is applicable here as well.

However should the next broadcast change occurrence notification tag indicate that in one of the following broadcast channel modification periods a content change in at least one of the M-SIBx is expected, then the process follows in step S26.

In that case the reading of the M-SIBx of the current broadcast channel modification period is preferably omitted, at it is expected that these information will be outdated in the next broadcast channel modification period.

Hence it is waited in step S27 until the next broadcast channel modification period starts.

Although the UE knows, that the M-SIBx will provide at least one content change, it is nevertheless necessary to read first the M-SIB1 of the new broadcast channel modification period in step S28.

It is expected that the broadcast channel change notification tag will provide an incremented BCCH value tag. Nevertheless still a barring indication flag might require the UE to terminate the operation with this base station.

Additionally an indication relating to the changed M-SIBx is preferably comprised in the M-SIB1 and allows for the UE to directly read only the changed M-SIBx.

All the necessary checks and exceptions are indicated with the interrupted arrow between step S28 and S29. Hence, in step S29 all or at least the changed M-SIBx of this broadcast channel modification period is read.

It can easily be seen that the problem for the envisaged UEs with the known structure of SIBs and broadcast channel modification periods will be solved with the invention. This allows for the enhanced coverage devices an operation with an optimization in terms of power consumption, reliability and response times.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for transmitting system information from a base station to a user equipment,
 the user equipment being a limited-bandwidth device, camping on the base station, and operating in idle mode, wherein the system information are divided in a plurality of system information blocks, which are at least once transmitted during one broadcast channel modification period,
 wherein at least one system information block further comprises a broadcast channel change notification tag indicating if a change on the system information has happened, and an element indicating in which system information block a content change has happened.

2. Method according to claim 1, comprising the step of transmitting a first system information block, the first system information block comprising at least
 a barring indication flag for limited-bandwidth devices,
 and wherein each other of the plurality of system information blocks is larger in size than the first system information block.

3. Method according to claim 2, wherein the first system information block further comprises a next broadcast change occurrence notification tag.

4. Method according to claim 2, wherein said first system information block further comprises an indication relating to at least one other of said plurality of system information blocks.

5. Method according to claim 1, wherein the system information further has associated a validity period, wherein the validity period for system information relating to limited-bandwidth devices is longer than for system information relating to non-limited-bandwidth devices.

6. Method according to claim 5, wherein an indication on the maximum of at least one of the validity periods is signaled as part of the system information.

7. Base station being part of a wireless cellular network comprising at least a transmitter, for serving at least one user equipment being a limited-bandwidth device and operating in idle mode,
the base station being configured to divide system information for limited-bandwidth devices in a plurality of system information blocks and transmitted at least once during one broadcast channel modification period by means of the broadcast channel to a limited-bandwidth device,
wherein the base station is further configured to:
transmit a first system information block,
wherein the first system information block comprises at least a broadcast channel change notification tag, indicating if a change on the system information has happened, and an element indicating in which system information block a content change has happened.

8. Base station according to claim 7,
wherein the first system information block further comprises a barring indication flag for limited-bandwidth devices, and
wherein each other of the plurality of system information blocks is larger in size than the first system information block.

9. Base station according to claim 7, wherein the first system information block further comprises a next broadcast change occurrence notification tag.

10. Base station according to claim 7, wherein said first system information block further comprises an indication relating to at least one other of said plurality of system information blocks.

11. Base station according to claim 7, wherein the base station is further configured to associate a validity period to the system information for limited-bandwidth devices, wherein the validity period of system information for limited-bandwidth devices is longer than for system information relating to non-limited-bandwidth devices.

12. Base station according to claim 11, further configured to transmit as part of the system information an indication on the maximum of at least one of the validity periods.

13. User equipment configured for operating in camping relationship with a base station of a wireless cellular network,
the user equipment being a limited-bandwidth device, when operating in idle mode further configured to receive a first system information block, comprising a part of system information being divided into a plurality of system information blocks,
wherein the first system information block further comprises at least
a broadcast channel change notification tag, indicating if a change on the system information has happened, and an element indicating in which system information block a content change has happened.

14. User equipment according to claim 13,
wherein the first system information block further comprises a barring indication flag for limited-bandwidth devices, and
wherein each other of the plurality of system information blocks is larger in size than the first system information block.

15. User equipment according to claim 13, wherein the first system information block further comprises a next broadcast change occurrence notification tag.

16. User equipment according to claim 13, wherein said first system information block further comprises an indication relating to at least one other of said plurality of system information blocks.

* * * * *